(12) United States Patent
Hagiwara et al.

(10) Patent No.: US 8,675,947 B2
(45) Date of Patent: Mar. 18, 2014

(54) X-RAY IMAGE DIAGNOSTIC SYSTEM, IMAGE PROCESSING APPARATUS AND IMAGE PROCESSING METHOD

(71) Applicant: Canon Kabushiki Kaisha, Tokyo (JP)

(72) Inventors: Katsuyuki Hagiwara, Tokyo (JP); Takashi Yoshida, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/868,208

(22) Filed: Apr. 23, 2013

(65) Prior Publication Data

US 2013/0236077 A1 Sep. 12, 2013

Related U.S. Application Data

(63) Continuation of application No. 13/295,244, filed on Nov. 14, 2011, now Pat. No. 8,452,070, which is a continuation of application No. 12/473,628, filed on May 28, 2009, now Pat. No. 8,077,957.

(30) Foreign Application Priority Data

Jun. 10, 2008 (JP) ................................. 2008-152255

(51) Int. Cl.
*G06K 9/00* (2006.01)
*G21C 17/00* (2006.01)

(52) U.S. Cl.
USPC ........... 382/132; 382/128; 382/312; 702/185; 600/431; 378/62

(58) Field of Classification Search
USPC ................. 382/312, 128–132, 313, 318, 319; 378/2, 62, 98.8; 702/185; 600/425–431
See application file for complete search history.

(56) References Cited

U.S. PATENT DOCUMENTS

| 5,930,411 | A | 7/1999 | Kojima et al. | 382/312 |
|---|---|---|---|---|
| 6,418,334 | B1 | 7/2002 | Unger et al. | 600/407 |
| 6,678,350 | B2 * | 1/2004 | Dolazza et al. | 378/98.9 |
| 7,634,308 | B2 | 12/2009 | Ogawa | 600/431 |
| 8,077,957 | B2 | 12/2011 | Hagiwara et al. | 382/132 |
| 8,452,070 | B2 * | 5/2013 | Hagiwara et al. | 382/132 |
| 2009/0264767 | A1 | 10/2009 | Griffin et al. | 600/459 |
| 2009/0304254 | A1 | 12/2009 | Yoshida | 382/132 |

FOREIGN PATENT DOCUMENTS

| JP | 05-244340 | 9/1993 |
|---|---|---|
| JP | 08-237652 | 9/1996 |

* cited by examiner

*Primary Examiner* — Hoa Pham
(74) *Attorney, Agent, or Firm* — Fitzpatrick, Cella, Harper & Scinto

(57) ABSTRACT

The present invention is an image processing apparatus that reconstructs one frame of image data using block-level image data, including a unit that receives the block-level image data to which position information has been added, a unit that determines whether or not there was an error in the transmission of the received position information, a first storage area used for storing the block-level image data corresponding to the position information for which a transmission error did not occur, a second storage area used for storing the block-level image data corresponding to the position information for which a transmission error occurred, a unit that infers correct position information for the block-level image data stored in the second storage area based on the first storage area and the second storage area, and a unit that reconstructs the one frame of image data using the inferred position information.

6 Claims, 8 Drawing Sheets

X-RAY IMAGE DIAGNOSTIC SYSTEM, IMAGE PROCESSING APPARATUS AND IMAGE PROCESSING METHOD

RELATED APPLICATIONS

This application is a continuation of application Ser. No. 13/295,244, filed Nov. 14, 2011, which is a continuation of application Ser. No. 12/473,628, filed May 28, 2009, claims benefit of the filing date of those applications under 35 U.S.C. §120, and claims priority benefit under 35 U.S.C. §119 of Japanese patent application no. 2008-152255, filed Jun. 10, 2008. The entire contents of all three mentioned earlier applications are incorporated herein by reference.

BACKGROUND OF THE INVENTION

1. Field of the Invention

The present invention relates to image processing technology for reconstructing one frame of image data by using image data that has been divided into a plurality of blocks and transmitted.

2. Description of the Related Art

A conventional X-ray image diagnostic system for capturing the interior of a subject by irradiating the subject with X-rays is known. Such an X-ray image diagnostic system is normally comprised of an imaging apparatus including an X-ray sensor and an image processing apparatus that processes image data obtained by image capture, and the apparatuses are respectively disposed at a distance of several meters to several tens of meters from each other. Consequently, processing to transmit image data between the imaging apparatus and the image processing apparatus is necessary in the X-ray image diagnostic system.

On the other hand, in recent years, with X-ray sensors becoming capable of performing processing at higher resolution and using more gradations, the throughput of image data has been increasing significantly. Demand for increasing frame rates has also been increasing. In view of this, for example, Japanese Patent Laid-Open No. 05-244340 proposes a technique for reading out image data from an X-ray sensor in an imaging apparatus using a plurality of readout circuits so as to concurrently perform such processing for a plurality of lines.

However, if the plurality of lines of image data is concurrently read out, the pieces of image data read out by the readout circuits need to be respectively consolidated in predetermined block units, stored in a memory, rearranged into a predetermined order, and then transmitted. Accordingly, such a configuration has problems in that the memory capacity of the imaging apparatus needs to be increased and, furthermore, data transmission requires considerable time.

Meanwhile, in order to address such problems, it is effective to add, to image data, position information to the blocks obtained when the image data was captured and to transmit the image data thereafter. Accordingly, the image processing apparatus can perform processing based on the position information so that the aforementioned problems where the memory capacity of the imaging apparatus needs to be increased or data transmission requires considerable time can be avoided.

However, when transmitting data, the occurrence of transmission errors is generally inevitable, and when transmitting image data to which position information has been added, a position information transmission error may occur in addition to an image data transmission error.

As for such image data transmission errors, if an error in transmission of part of image data occurs in the image data transmitted in blocks, only that part of the image data will be missing; thus, it can be said that influence on image data to be reconstructed by the image processing apparatus is relatively small.

On the contrary, if an error in the transmission of position information added to block-level image data occurs, that image data will be missing at the block level, resulting in a great influence on image data to be reconstructed by the image processing apparatus. Accordingly, it can be said that it is necessary to apply a technique such as error correction codes or the like (see, for example, Japanese Patent Laid-Open No. 08-237652) for a position information transmission error. In general, Hamming code, Reed-Solomon Code, and the like are known as a technique for the error correction code that can be applied to address such a transmission error.

However, when using such error correction codes as described above, there is a problem in that error correction is difficult if errors concurrently occur in each instance of transmission of position information added to a plurality of blocks (if a burst error occurs). That is, it is difficult to realize reconstruction of appropriate image data.

SUMMARY OF THE INVENTION

The present invention was achieved in view of the above problems.

An image processing apparatus according to the present invention includes the following configurations. That is, an image processing apparatus that reconstructs one frame of image data using block-level image data obtained by dividing the image data into a predetermined number of blocks and transmitting the image data includes: a reception unit that receives position information that is information indicating a position of the image data in a frame when the one frame of image data is reconstructed using the block-level image data, together with the block-level image data, a determination unit that determines whether or not there was an error in the transmission of the position information received by the reception unit, a first storage unit that stores the block-level image data corresponding to the position information determined by the determination unit not to have a transmission error in a storage section corresponding to a position indicated in the position information, and a second storage unit that stores the block-level image data corresponding to the position information determined by the determination unit to have a transmission error, an inference unit that infers position information for the block-level image data stored in the second storage unit based on a storage section in the first storage unit in which the block-level image data is not stored when the number of storage sections in the first storage unit in which the block-level image data is not stored matches the number of pieces of the block-level image data stored in the second storage unit, and a reconstruction unit that reconstructs the image data of the frame using the block-level image data that has been stored in the first storage unit and the corresponding position information, the image data stored in the second storage unit, and the position information inferred by the inference unit.

According to the present invention, when image data in blocks to which position information has been added is received, and one frame of image data is reconstructed, the appropriate image data can be reconstructed even if a plurality of errors in transmission of position information occur.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described in detail in accordance with the accompanying drawings.

It should be noted that in an X-ray image diagnostic system described in the following exemplary embodiments, when one frame of image data is transmitted from an imaging apparatus, an image processing apparatus is assumed to recognize in advance the number of blocks into which the data is divided and transmitted.

In the image processing apparatus, under the above assumption, image data transmitted in blocks is stored in a predetermined storage section in a first storage area (a first storage unit) corresponding to position information added to the image data at the block level.

At this time, if a position information transmission error occurs, the block-level image data is stored in a second storage area (a second storage unit) that is different from the first storage area.

Consequently, when the transmission of one frame's worth of image data has been completed, block-level image data to which position information for which a transmission error has occurred is added is not stored in the first storage area. Instead, the block-level image data is stored in the second storage area.

Accordingly, the image processing apparatus can infer in which storage section the block-level image data to which position information for which a transmission error has occurred is added was to originally be stored (what position information is included) by comparing the first storage area to the second storage area.

As a result of the above, even if a position information transmission error occurs, error correction can be performed so as to obtain the appropriate position information. That is, it is possible to avoid overwriting block-level image data that has already properly been transmitted with the block-level image data for which a transmission error occurred. Hereinafter, details of exemplary embodiments are described.

First Exemplary Embodiment

1. Overall Configuration of X-Ray Image Diagnostic System And Internal Configurations of Imaging Apparatus And Image Processing Apparatus First, with reference to FIG. 1, the overall configuration of an X-ray image diagnostic system according to an exemplary embodiment of the present invention and the internal configurations of an imaging apparatus and an image processing apparatus of which the X-ray image diagnostic system is configured shall be described.

1.1 Overall Configuration of X-Ray Image Diagnostic System

Figure 1:
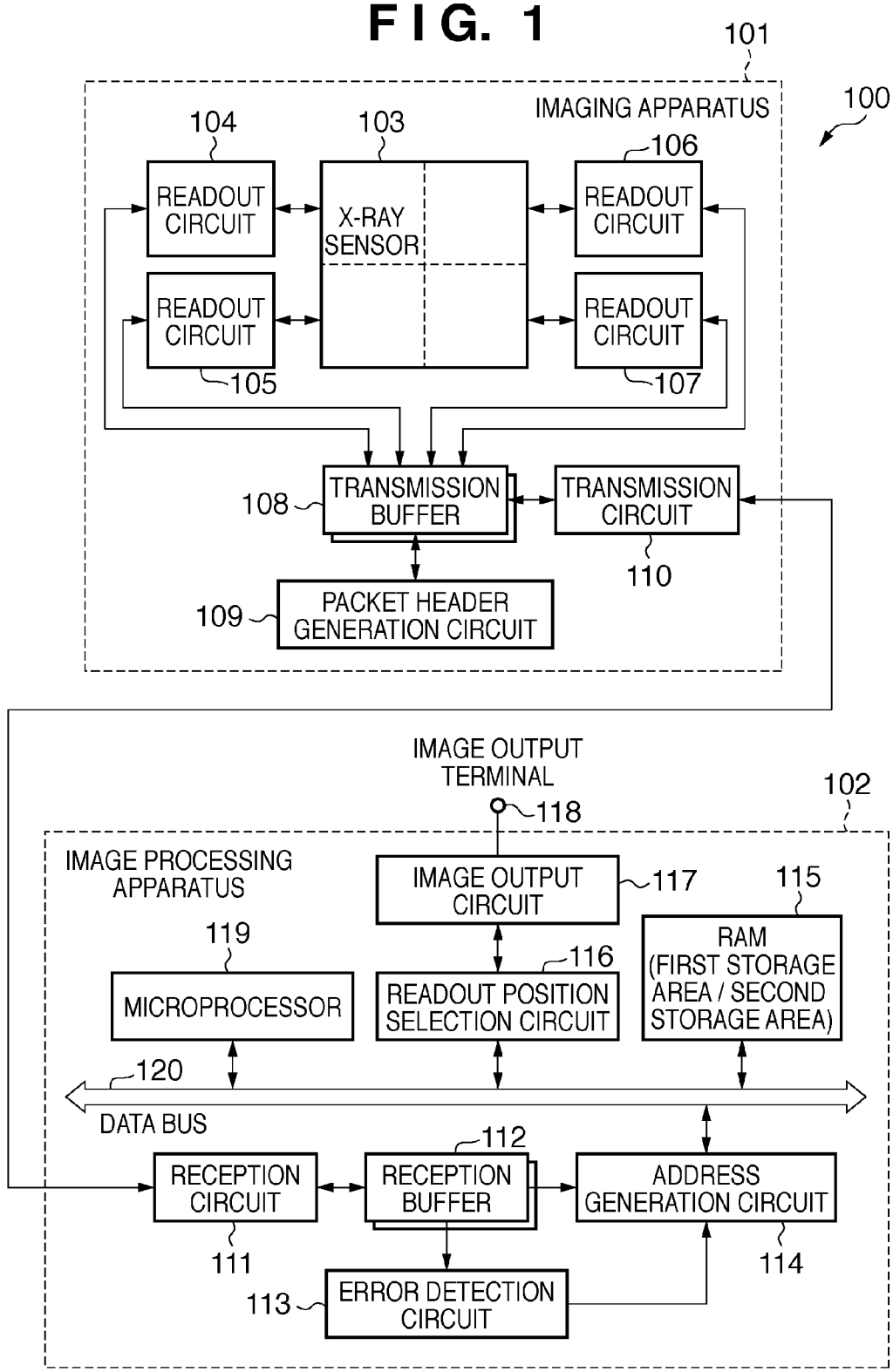
FIG. 1 is a diagram showing the overall configuration of an X-ray image diagnostic system and the internal configurations of an imaging apparatus and an image processing apparatus of which the X-ray image diagnostic system is configured according to an exemplary embodiment of the present invention.

As shown in FIG. 1, an X-ray image diagnostic system 100 includes an imaging apparatus 101 and an image processing apparatus 102, which are connected to each other so as to enable transmission of image data between the imaging apparatus 101 and the image processing apparatus 102.

Specifically, the imaging apparatus 101 and the image processing apparatus 102 are connected via a transmission circuit 110 and a reception circuit 111, respectively.

1.2 Internal Configuration of Imaging Apparatus

Next, the internal configuration of the imaging apparatus 101 of which the X-ray image diagnostic system 100 is partially configured will be described.

The imaging apparatus 101 includes an X-ray sensor 103, which converts X-rays into an electrical signal, and readout circuits 104 to 107, which read out an electrical signal from the X-ray sensor 103 and convert the signal into digital image data.

As described above, the X-ray image diagnostic system 100 according to the present exemplary embodiment can cause the plurality of readout circuits 104 to 107 to operate in parallel in order to increase the speed to read out an electrical signal from the X-ray sensor 103.

Figure 2:
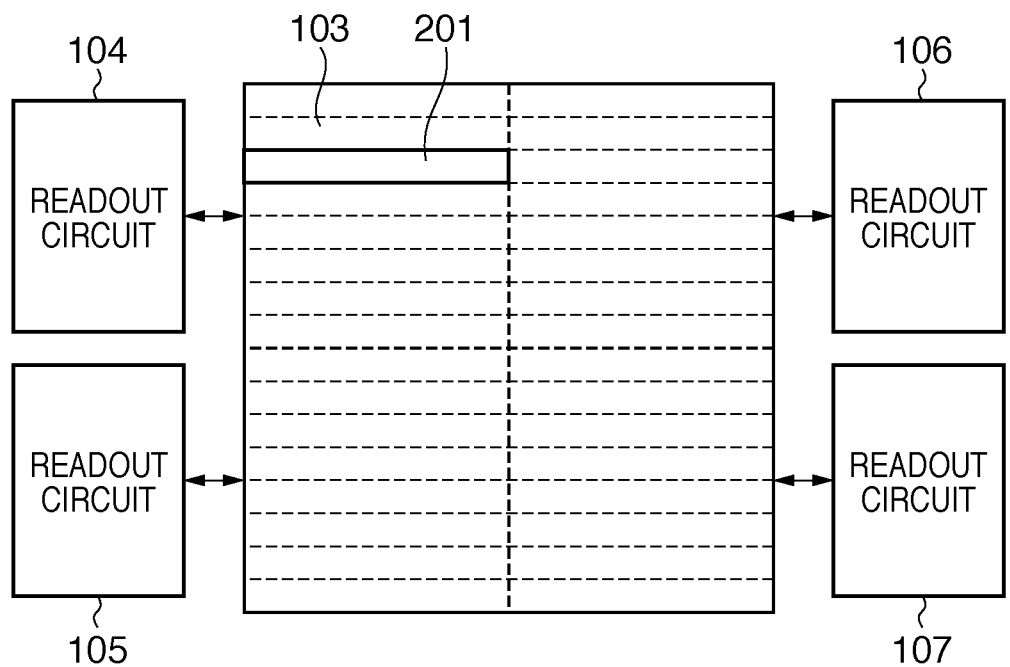
FIG. 2 is a diagram showing the relationship between an X-ray sensor 103 and readout circuits 104 to 107.

FIG. 2 is a diagram showing the relationship between the X-ray sensor 103 and the readout circuits 104 to 107. As shown in FIG. 2, the readout circuits 104 to 107 read out, in a predetermined order, pieces of image data in blocks corresponding to each area of an X-ray sensor connected to a respective readout circuit (one section divided with a dotted line in FIG. 2 indicates one block).

Referring again to FIG. 1, the imaging apparatus 101 further includes a transmission buffer 108, a packet header generation circuit 109, and the transmission circuit 110.

The transmission buffer 108 is a memory for temporarily storing block-level image data read out by the readout circuits 104 to 107 until the data is transmitted as an image data packet (details will be described later).

Here, image data is read out and transmitted in blocks as described with reference to FIG. 2 in the X-ray image diagnostic system 100 according to the present exemplary embodiment. For example, after a block 201 is read out by the readout circuit 104, the block is stored together with a packet header, described later, in the transmission buffer 108 until the block and the header are transmitted as an image data packet.

Note that one block is not limited to a rectangle area as shown in FIG. 2 and, for example, one line may be used as one block. Further, a different shape may be defined for each block, and information indicating the shape of each block may be included in the packet header.

The packet header generation circuit 109 is a circuit for generating a packet header portion included in an image data packet and generates a check code for detecting a position information transmission error, and the like. Note that examples of a method for detecting a transmission error include a checksum test, a cyclic redundancy check, and the like.

Also, instead of generating a check code, an error correction code that corrects a transmission error in m bits or detects a transmission error in n bits (m<n) may be generated.

Figure 3:
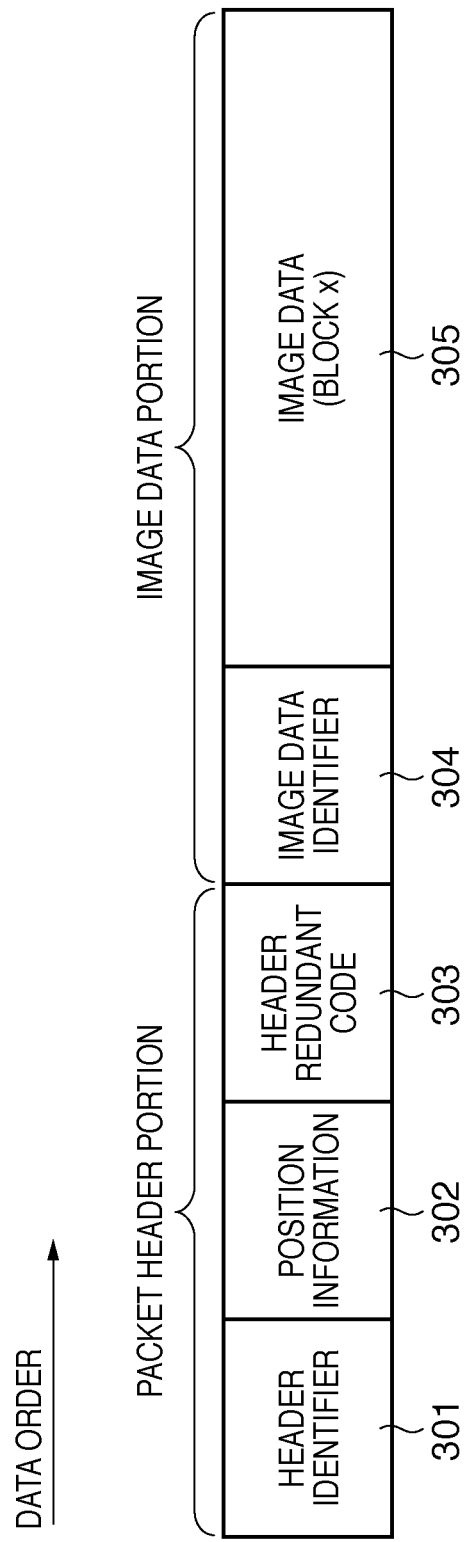
FIG. 3 is a diagram showing one example of an image data packet when an imaging apparatus 101 transmits image data that has been divided into a plurality of blocks.

FIG. 3 is a diagram showing one example of an image data packet used when the imaging apparatus 101 transmits image data that has been divided into a plurality of blocks.

A packet header portion is made up of a header identifier 301, position information 302, and a header redundant code 303. An image data portion is made up of image data identifier 304 and block-level image data 305 (block x, where x is an integer from 1 to n).

The header identifier 301 is a predetermined value for indicating a start of a packet header portion. If communication is temporarily disconnected and recovered, a starting position of a packet header portion can be inferred based on the header identifier 301.

The position information 302 is information indicating from which position of the X-ray sensor 103 the block-level image data 305 stored in the image data portion has been obtained. The position information 302 is used as information indicating a position in a frame when image data is reconstructed in the image processing apparatus 102.

Note that the position information 302 is not limited to this and, for example, may be made up of information indicating that the block-level image data 305 is image data that has been read out and from which circuit among the readout circuits 104 to 107 the image data has been read, or in what order the image data has been read out. In any case, any information can be applied as long as the information specifies in which position of the frame the block-level image data is disposed when image data is reconstructed in the image processing apparatus 102.

The header redundant code 303 is a value that is generated by the packet header generation circuit 109 using the header identifier 301 and the position information 302 and that is used when a transmission error is detected.

The image data identifier 304 is a predetermined value indicating a starting position of the image data portion.

1.3 Internal Configuration of Image Processing Apparatus

Next, the internal configuration of the image processing apparatus 102 of which the X-ray image diagnostic system 100 is partially configured will be described.

As shown in FIG. 1, the image processing apparatus 102 includes a reception circuit 111, a reception buffer 112, an error detection circuit 113, an address generation circuit 114, and a RAM 115.

The reception circuit 111 is a circuit that receives an image data packet transmitted from the imaging apparatus 101.

The reception buffer 112 is a memory for temporarily storing an image data packet received by the reception circuit 111.

The error detection circuit 113 is a circuit for detecting whether or not there is an error in the transmission of the position information 302 stored in the packet header portion of the received image data packet. The error detection circuit 113 detects whether or not there is an error in the transmission of the position information 302 by checking the consistency of the header redundant code 303 with respect to the header identifier 301 and the position information 302.

Note that although the example shown in FIG. 1 shows a configuration in which only a circuit for detecting an error in transmission of the position information 302 is provided, the present invention is not limited to this, and a circuit for detecting an error in transmission of the block-level image data 305 may be further provided.

The address generation circuit 114 has a function of selecting either storage area between the first storage area and the second storage area that are provided in the RAM 115 based on a result of detection performed by the error detection circuit 113. Note that the address generation circuit 114 has a function as, what is called, a DMA controller and can transfer the block-level image data 305 in the reception buffer 112 to the above selected storage area.

Moreover, the address generation circuit 114 generates an address in the first storage area based on the position information 302 if the error detection circuit 113 did not detect a transmission error. Also, the address generation circuit 114 generates an address in the second storage area based on the order of detection if the error detection circuit 113 has detected a transmission error.

The image processing apparatus 102 further includes a readout position selection circuit 116 for reading out block-level image data stored in the RAM 115 in a predetermined order and reconstructing image data. Also, the image processing apparatus 102 includes an image output circuit 117 and an image output terminal 118 for performing image processing on the reconstructed image data and outputting the data.

Note that in addition to the abovementioned elements, the image processing apparatus 102 includes a microprocessor 119, which controls units of the image processing apparatus, a data bus 120, which connects the units, a ROM (not shown) that has stored therein a program for the microprocessor 119, a power unit (not shown), and the like.

Moreover, the image processing apparatus 102 is connected to an X-ray generating unit (not shown) and a user interface unit (not shown), can generate X-rays in accordance with instructions from a user, and can obtain image data from the imaging apparatus 101.

1.4 Configuration of RAM 115

Figure 4:
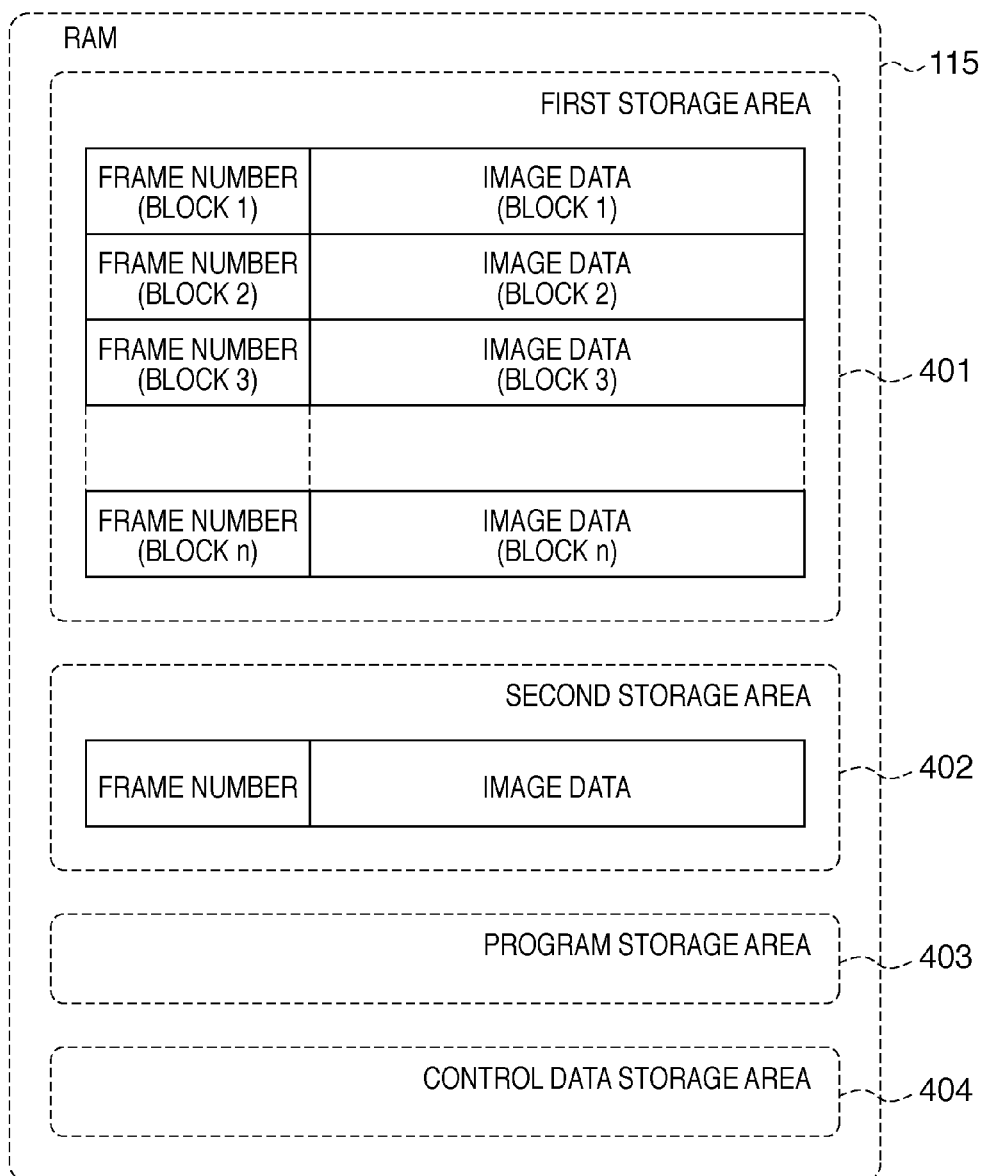
FIG. 4 is a diagram showing one example of a state in which block-level image data is stored in a RAM 115.

FIG. 4 is a diagram showing one example of a state in which block-level image data is stored in the RAM 115. As shown in FIG. 4, the RAM 115 includes a first storage area 401, and block-level image data is stored in a storage position, corresponding to the position information 302, of the first storage area 401. Further, the RAM 115 includes a second storage area 402 for storing block-level image data to which is added the position information 302 at which a transmission error has occurred.

Moreover, the RAM 115 includes a program storage area 403 and a control data storage area 404, in which a program and control data used by the microprocessor 119 are stored.

Note that the first storage area 401 and the second storage area 402 are provided with storage sections in which frame numbers used for specifying the frame that block-level image data belongs to are stored in association with storage sections used for storing block-level image data.

Of these, the second storage area 402 is assumed to include enough capacity for storing one block's worth of image data and one block's worth of frame numbers.

2. Flow of Processing For Storing Image Data Performed By Address Generation Circuit 114

Figure 5:
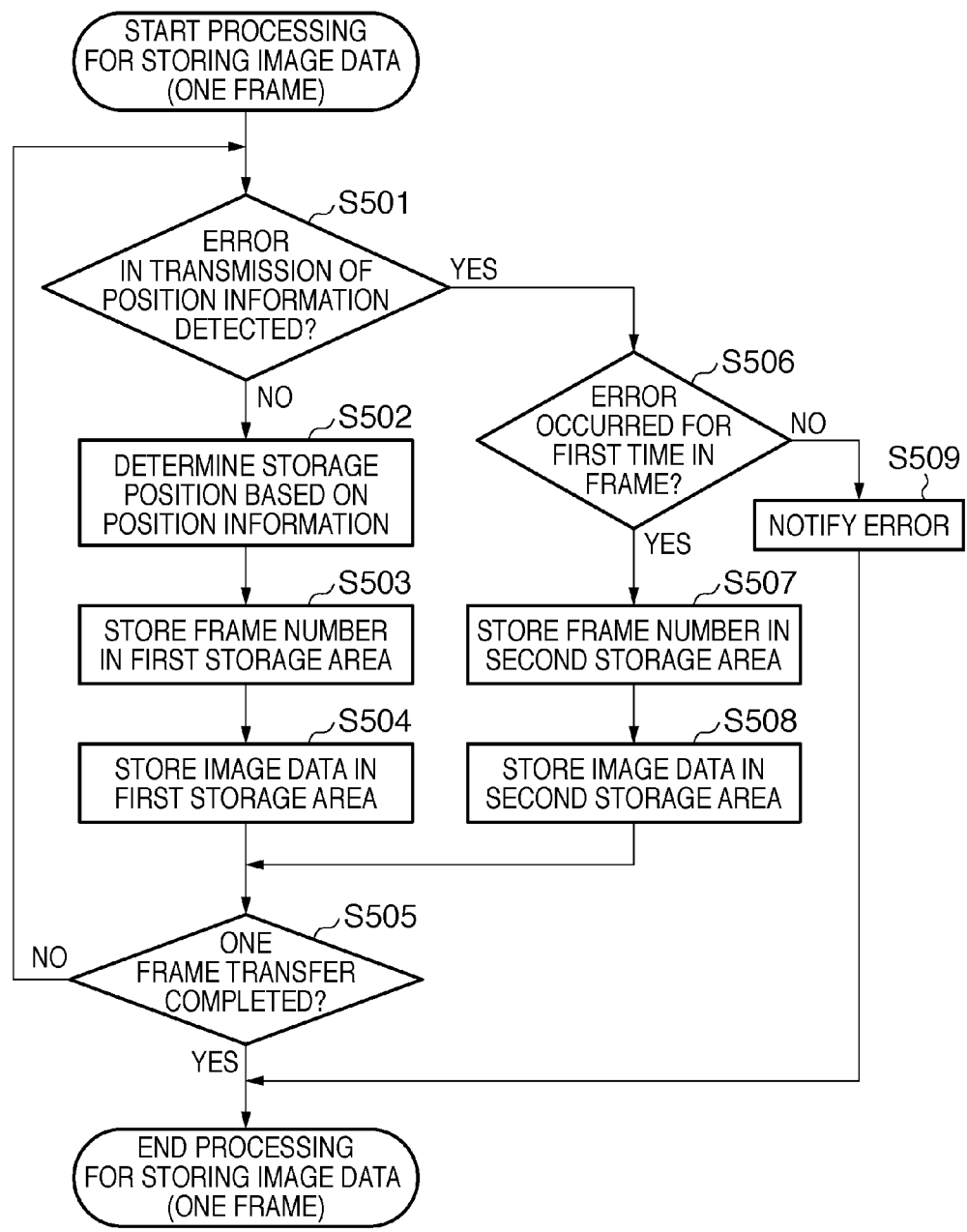
FIG. 5 is a flowchart showing a flow of processing for storing block-level image data (one frame's worth) performed by an address generation circuit 114.

Next, with reference to FIG. 5, a flow of processing for storing block-level image data (one frame's worth) performed by the address generation circuit 114 will be described.

In step S501, it is determined whether or not an error in transmission of the position information 302 has been detected by the error detection circuit 113. If it is determined that a transmission error has not been detected, the processing proceeds to step S502.

The processing indicated by steps S502 to S505 is processing performed when the first storage area 401 is selected, for storing block-level image data. In step S502, a storage section in the first storage area 401 corresponding to position information added to block-level image data to be processed is determined In step S503, a frame number of a frame to which received block-level image data belongs is stored in a storage section associated with the storage section determined in step S502.

In step S504, block-level image data to be processed is stored in the storage section determined in step S502.

In step S505, it is determined whether or not the transfer of one frame of image data has been completed, and if the transfer is determined to be incomplete, the processing returns to step S501, and the above processing is repeated.

On the other hand, if it is determined that a transmission error was detected in step S501, the processing proceeds to step S506.

In step S506, it is determined whether the transmission error is an error that occurred for the first time or the second time in one frame. If the error is determined to be the first transmission error, the processing proceeds to step S507, and if the error is determined to be the second transmission error, the processing proceeds to step S509.

In step S507, a frame number of a frame to which block-level image data to be processed belongs is stored in a storage section used for storing a frame number in the second storage area 402.

In step S508, block-level image data to be processed is stored in a storage section associated with the storage section in which the frame number was stored in step S507.

On the other hand, if the error detection circuit 113 determines that the error is a transmission error that has occurred for the second time in one frame, the microprocessor 119 is notified, in step S509, with a signal indicating a reception error that cannot be remedied. That is, if a position information transmission error occurs twice in the same frame, the image processing apparatus 102 recognizes the state to be an error.

As described above, the address generation circuit 114 selects the first storage area 401 or the second storage area 402 in accordance with whether or not a position information transmission error has been detected, and stores block-level image data together with a frame number.

That is, if block-level image data is stored in the second storage area 402 because the error detection circuit 113 has detected a transmission error, a frame number of a corresponding storage section in the first storage area 401 is not updated so that a frame number of a former frame remains.

3. Flow of Processing For Reconstructing Image Data Performed By Readout Position Selection Circuit 116

Figure 6:
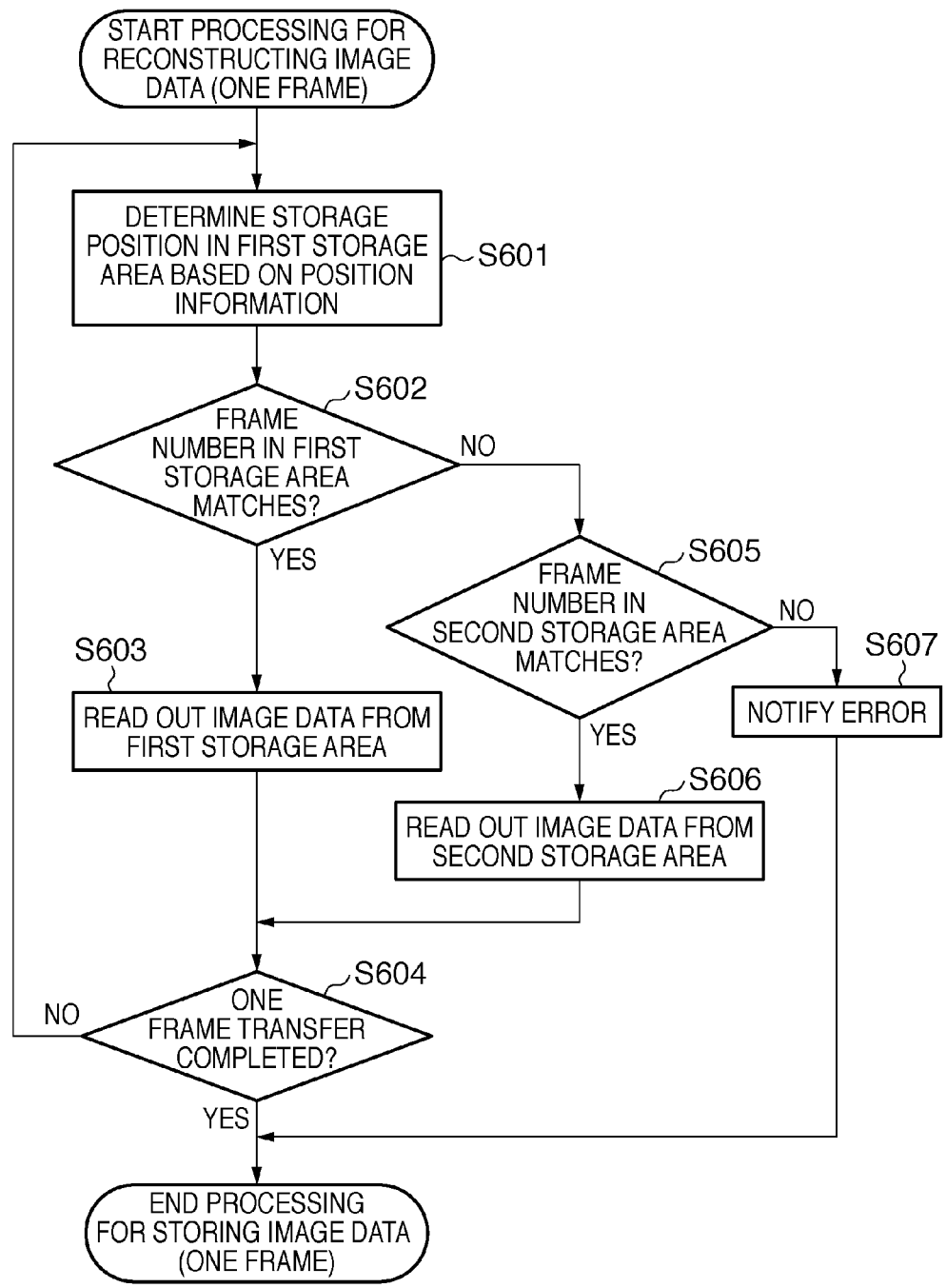
FIG. 6 is a flowchart showing a flow of processing for reconstructing image data performed by a readout position selection circuit 116.

Next, with reference to FIG. 6, a flow of processing for reconstructing image data performed by the readout position selection circuit 116 will be described.

The readout position selection circuit 116 reads out block-level image data when image data is reconstructed. In step S601, a storage section for a frame number associated with a storage section in the first storage area 401 is calculated corresponding to position information for block-level image data that is required to be read out.

In step S602, it is determined whether or not the frame number stored in the storage section calculated in step S601 matches the frame number of a frame to be processed. If the frame number is determined to match in step S602, the processing proceeds to step S603. On the other hand, if the frame number is determined not to match (to not be the same, or in other words, if it is determined that the frame number has not been updated), the processing proceeds to step S605.

In step S603, block-level image data stored in the storage section in the first storage area 401 corresponding to position information for block-level image data that is required to be read out is read out.

In step S604, it is determined whether or not the readout of one frame of image data has been completed, and if the readout is determined to be incomplete, the processing returns to step S601, and the above processing is repeated.

On the other hand, if it is determined that the frame number stored in the storage section calculated in step S601 does not match the frame number of the frame to be processed, the frame number in the second storage area is confirmed in step S605. If the frame number in the second storage area matches the frame number of the frame to be processed, the processing proceeds to step S606, whereas if the numbers do not match (are not the same), the processing proceeds to step S607.

In step S606, block-level image data stored in the second storage area is determined to be block-level image data that was originally to be stored in the storage section in the first storage area associated with the frame number that has not been updated. Thereafter, the second storage area 402 is selected so as to read out the block-level image data.

On the other hand, if it is determined that the frame number in the second storage area does not match (is not the same as) the frame number of the frame to be processed, the processing proceeds to step S607. In step S607, it is determined that block-level image data was already missing when the block-level image data was stored in the RAM 115. Then, the microprocessor 119 is notified with a signal indicating a reception error.

As is apparent from the above description, based on position information added to block-level image data that has been transmitted, the block-level image data is stored with a frame number in the first storage area in the present exemplary embodiment. Meanwhile, block-level image data to which position information for which a transmission error has occurred is added is stored in the second storage area, which is different from the first storage area, at this time.

Thereby, at the point in time when transmission of one frame of image data has been completed, block-level image data to which position information for which a transmission error did not occur is added is stored in a storage section in the first storage area corresponding to the position information. Further, block-level image data to which position information for which a transmission error has occurred is added is not stored in the storage section where the block-level image data would be stored if an error in transmission of position information did not occur. Moreover, a frame number that has not been updated remains in a storage section associated with the storage section in which the image data is not stored.

On the other hand, block-level image data to which position information for which a transmission error has occurred is added is stored in the second storage area.

As a result of the above, the image processing apparatus can uniquely recognize which block-level image data corresponds to the block-level image data that position information for which a transmission error has occurred is added to and in which storage section the data was originally to be stored, by comparing the first storage area to the second storage area. That is, the correct position information for block-level image data to which position information for which a transmission error has occurred is added can be inferred.

Accordingly, in the present exemplary embodiment, even if an error in transmission of position information occurs, such incorrect information can be corrected to appropriate position information.

Second Exemplary Embodiment

In the aforementioned first exemplary embodiment, when one frame of image data is transmitted, error correction is performed only if a position information transmission error occurs once. However, the present invention is not limited to this and is also applicable to a case in which a transmission error occurs a number of times.

As described above, in the first exemplary embodiment, if a transmission error is detected in a frame, it is determined whether the transmission error is the first transmission error or the second transmission error.

In contrast, in the present exemplary embodiment, if a transmission error is detected in a frame, data is sequentially stored in the second storage area 402 in accordance with the order of transmission. When image data is reconstructed, each piece of block-level image data stored in the second storage area 402 is assigned to each storage section associated with a storage section in which a frame number that has not been updated is stored. At this time, which block-level image data is assigned to which storage section is based on correlation between pixels in the vicinity of a boundary area when data is assigned to a storage section. As a result of this, even if a position information transmission error occurs a number of times, error correction can be performed. Details of the present exemplary embodiment are described below.

1. Flow of Processing For Reconstructing Image Data Performed By Readout Position Selection Circuit With reference to FIG. 7, a flow of processing for reconstructing image data performed by the readout position selection circuit 116 will be described.

A number N indicating the number of pieces of block-level image data stored in the second storage area 402 (the number of blocks) is obtained in step S701.

A number M indicating the number of storage sections in the first storage area 401 in which frame numbers that have not been updated is obtained in step S702. That is, among the frame numbers stored in the first storage area, the number of frame numbers that are different from frame numbers of frames to be processed is the number M.

The aforementioned two numbers M and N are compared in step S703. If both numbers match, processing proceeds to step S704, and if the numbers are different, processing proceeds to step S707.

In processing in step S704 and after, error correction is performed by inferring a storage section in the first storage area in which each piece of block-level image data stored in the second storage area 402 would have been stored if a transmission error did not occur.

First, when pieces of block-level image data in the second storage area 402 are respectively assigned to a storage section associated with a storage section in the first storage area 401 in which a frame number that has not been updated is stored, a continuity evaluation value between block boundary pixels is calculated in step S704.

A continuity evaluation value is, for example, a correlation coefficient, the sum of squared differences, or the sum of absolute differences (SAD).

In step S705, a combination of greatest continuity is determined to be a storage position inference result using the continuity evaluation value calculated in step S704.

In step S706, each piece of block-level image data and a frame number in the second storage area 402 are transferred to the storage section in the first storage area 401 determined based on the storage position inference result.

On the other hand, if the number N, which indicates the number of the pieces of block-level image data stored in the second storage area 402 (the number of blocks), and the number M, which indicates the number of frame numbers in the first storage area 401 that have not been updated, are different, the processing proceeds to step S707. In step S707, it is determined that the block-level image data 305 has not been appropriately received, and error correction cannot be performed; thus, a signal notifying a reception error is provided, ending the processing.

2. Method For Calculating Continuity Evaluation Value

Figure 7:
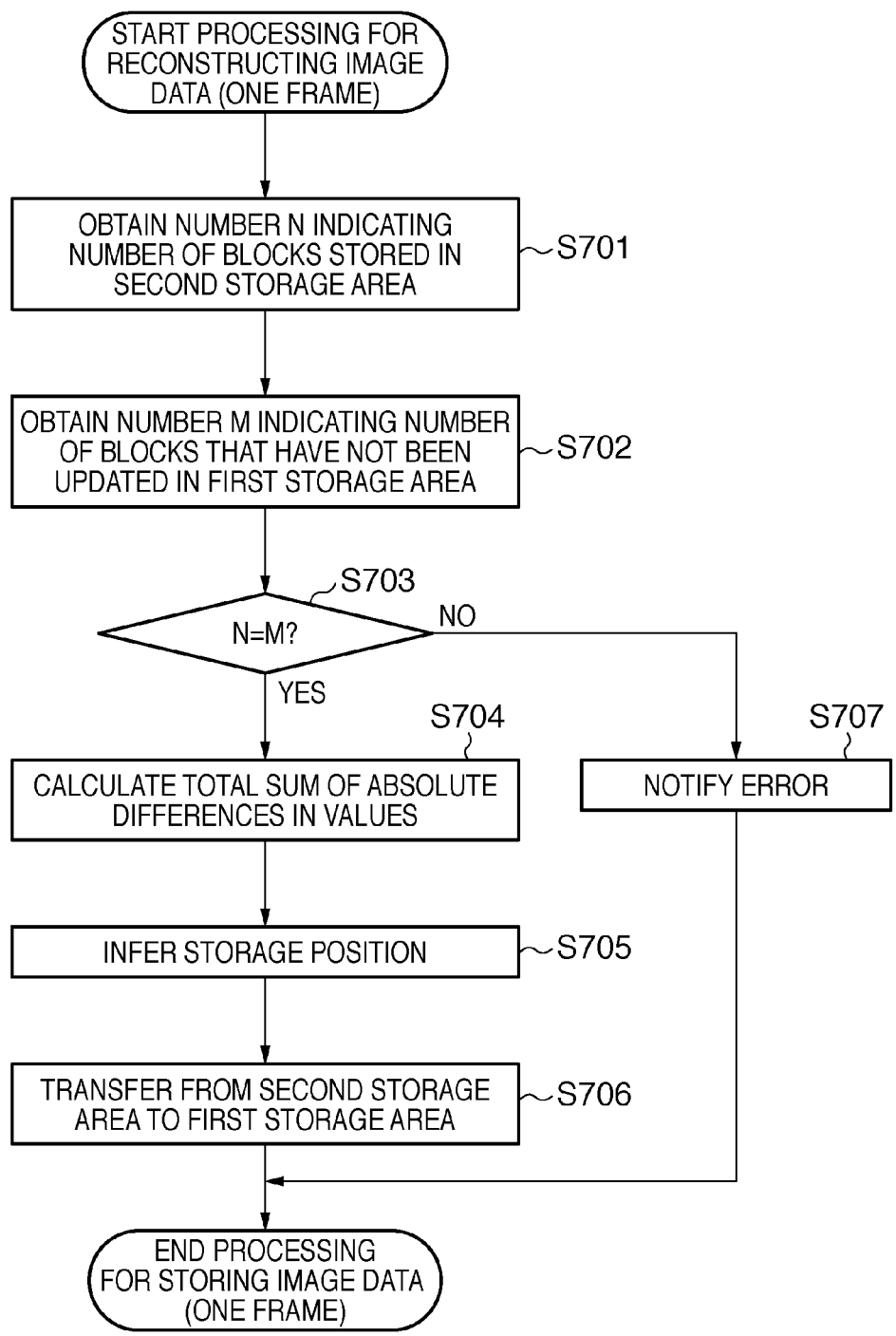
FIG. 7 is a flowchart showing a flow of processing for reconstructing image data performed by the readout position selection circuit 116.
Figure 8:
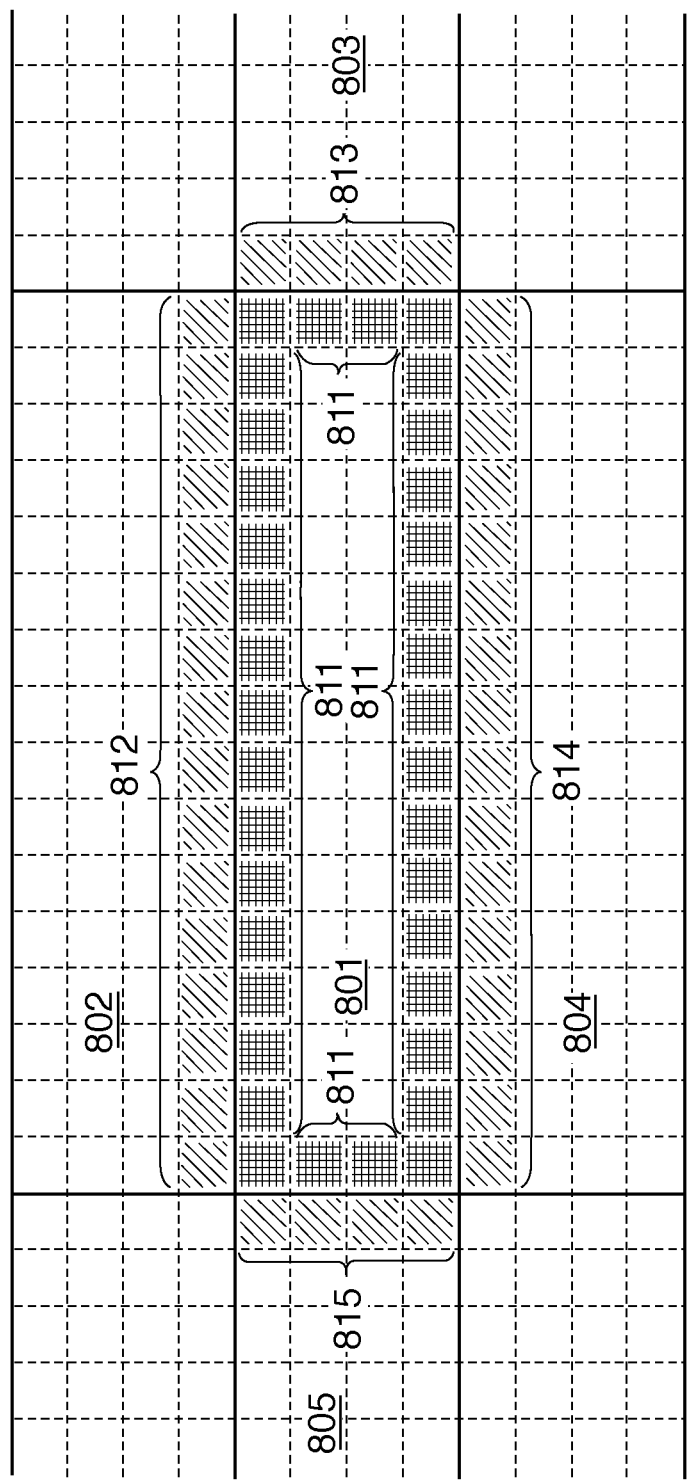
FIG. 8 is a diagram for illustrating processing for calculating a continuity evaluation value.

Details of processing for calculating a continuity evaluation value performed in step S704 in FIG. 7 will be described with reference to FIG. 8.

When calculating a continuity evaluation value, first, any storage section is selected from the storage sections in the first storage area 401 associated with frame numbers that have not been updated. Also, any block-level image data is selected from pieces of block-level image data in the second storage area 402.

Next, the selected block-level image data is assigned to the selected storage section. FIG. 8 shows a state in which block-level image data 801, which has been selected, is assigned to the selected storage section.

Next, boundary pixels between the assigned block-level image data 801 and block-level image data (802 to 805) adjoining the selected storage section are selected. In FIG. 8, reference numerals 811 to 815 denote the selected boundary pixels.

When boundary pixels are selected, the readout position selection circuit 116 calculates the total sum of absolute differences in values between adjoining boundary pixels. Specifically, the total sum of the absolute difference in values between boundary pixels 811 and boundary pixels 812, the absolute difference in values between the boundary pixels 811 and boundary pixels 813, the absolute difference in values between the boundary pixels 811 and boundary pixels 814, and the absolute difference in values between the boundary pixels 811 and boundary pixels 815 is calculated.

The readout position selection circuit 116 performs the above processes for all combinations of storage sections in the first storage area 401 associated with frame numbers that have not been updated and pieces of block-level image data in the second storage area 402. Thereafter, the combination, whose total sum of the absolute differences in values (the combination of the greatest continuity), is determined as the exact storage section for each piece of block-level image data in the second storage area 402, and the appropriate position information is inferred.

As is apparent from the above description, in the present exemplary embodiment, a continuity evaluation value is calculated in a case in which pieces of block-level image data stored in the second storage area are assigned to storage sections in the first storage area associated with frame numbers that have not been updated. Then, based on the calculated continuity evaluation value, the correct position information for each piece of block-level image data in the second storage area is inferred so that error correction is performed.

As a result of the above, even if a position information transmission error occurs a number of times in one frame, error correction can be performed.

Other Exemplary Embodiments

It should be noted that the present invention may be applied to a system configured of a plurality of devices (for example, a host computer, an interface device, a reader, a printer, etc.), or may also be applied to an apparatus configured of one apparatus (for example, a copying machine, a facsimile apparatus, etc.).

It goes without saying that an object of the present invention can be accomplished by a configuration in which a computer readable storage medium having recorded therein a program code of software that realizes the functionality of the aforementioned exemplary embodiments is supplied to a system or an apparatus. In this case, the aforementioned functionality is realized by a computer (or a CPU or an MPU) in the system or apparatus reading out and executing the program code stored in the storage medium. Note that, in such a case, the storage medium having stored therein the program code constitutes the present invention.

Examples of a storage medium for supplying the program code include a floppy (registered trademark) disk, a hard disk, an optical disk, a magneto-optical disk, a CD-ROM, a CD-R, magnetic tape, a non-volatile memory card, a ROM, and the like.

The present invention is not limited to a case in which the functionality of the aforementioned exemplary embodiments can be realized by a computer executing the read-out program code. For example, it goes without saying that the present invention is also applicable to a case in which an OS (operating system) or the like running on a computer may execute part or all of the actual processing based on instructions included in the program code, and the functionality of the aforementioned exemplary embodiments can be realized by such processing.

Furthermore, the present invention is also applicable to a case in which the program code read out from the storage medium may be written into a memory provided in a function expansion board inserted into the computer or a function expansion unit connected to the computer, and executed, thereby, realizing the functionality of the aforementioned exemplary embodiments. That is, the present invention is also applicable to a case in which after the program code has been written into the memory, a CPU or the like included in the function expansion board or function expansion unit performs all or part of the actual processing based on instructions included in the program code, and the functionality of the aforementioned exemplary embodiments can be realized by such processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus that reconstructs block-level image data obtained by dividing image data into a predetermined number of blocks and transmitting the image data, comprising:
    a reception unit configured to receive position information indicating a position of the block-level image data in the image data, together with the block-level image data;
    a determination unit configured to determine whether or not there is an error in the transmission of the position information received by the reception unit; and
    a notification unit configured to provide a notification of the error if the number of transmission errors determined by the determination unit is more than two.

2. An X-ray image diagnostic system comprising:
    an image processing apparatus according to claim 1; and
    an imaging apparatus that transmits, to said image processing apparatus, image data captured by irradiating a subject with X-rays.

3. The apparatus according to claim 1, wherein said notification unit provides the notification of the error if a position information transmission error occurs twice in the same frame.

4. The apparatus according to claim 1, wherein said notification unit provides a notification of a reception error that cannot be remedied if the error is a transmission error that has occurred for the second time in one frame.

5. An image processing method performed in an image processing apparatus that reconstructs block-level image data obtained by dividing image data into a predetermined number of blocks and transmitting the image data, the method comprising:
    receiving position information indicating a position of the block-level image data in the image data, together with the block-level image data;
    determining whether or not there is an error in the transmission of the position information received in said receiving step; and
    notifying of the error if the number of transmission errors determined in said determining step is more than two.

6. A non-transitory computer-readable storage medium storing a program that causes a computer to execute an image processing method according to claim 5.

* * * * *